Figure 1:
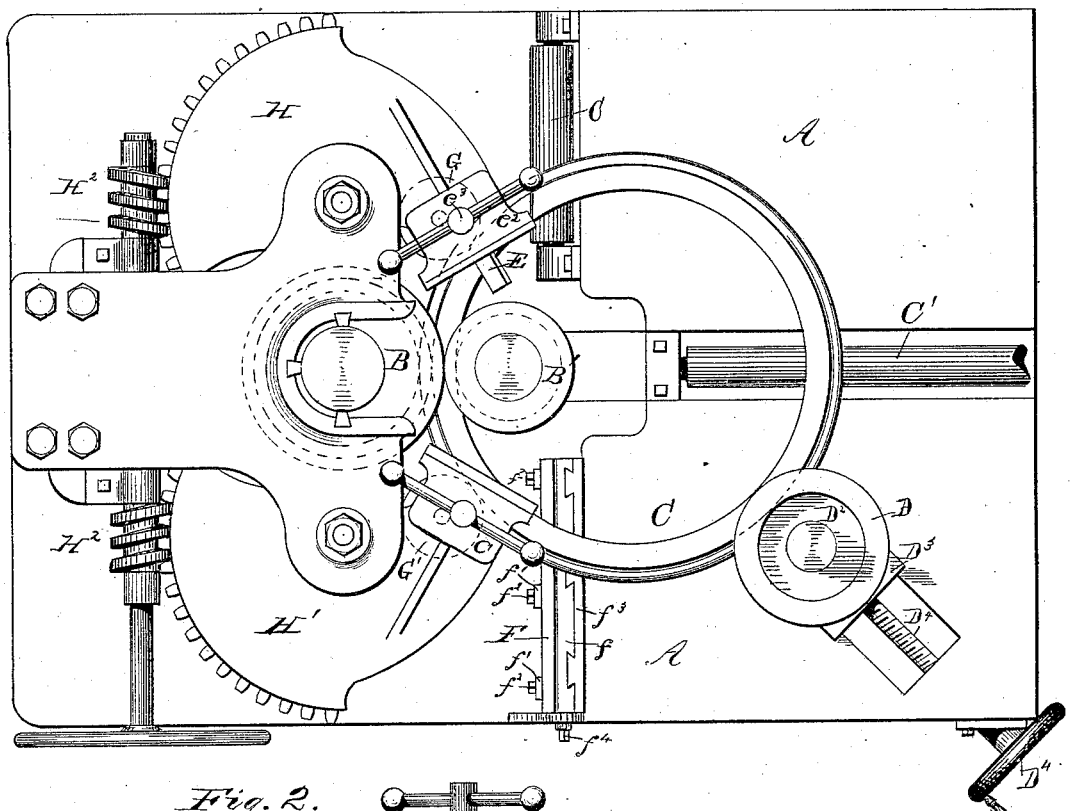

(No Model.) 2 Sheets—Sheet 1.

J. MUNTON.
TIRE ROLLING MACHINE.

No. 307,217. Patented Oct. 28, 1884.

Witnesses:
Charles L. Carman.
Taylor E. Brown.

Inventor:
James Munton
By Munday, Evarts & Adcock
His Attorneys.

(No Model.) 2 Sheets—Sheet 2.

J. MUNTON.
TIRE ROLLING MACHINE.

No. 307,217. Patented Oct. 28, 1884.

Witnesses:
Chas L Carman
Taylor E Brown

Inventor:
James Munton
By Munday, Evarts & Adcock
His Attorneys

UNITED STATES PATENT OFFICE

JAMES MUNTON, OF MAYWOOD, ILLINOIS.

TIRE-ROLLING MACHINE.

SPECIFICATION forming part of Letters Patent No. 307,217, dated October 28, 1884.

Application filed February 4, 1884. (No model.)

*To all whom it may concern:*

Be it known that I, JAMES MUNTON, a citizen of Great Britain, residing in Maywood, in the county of Cook and State of Illinois, have invented a new and useful Improvement in Tire-Rolling Machines, of which the following is a specification.

My invention consists, in connection with the rolls, of rotary cutters for removing the fins from the tire or bloom while it is being rolled. Two rotary cutters are employed, one for removing the fin from the upper edge of the tire and one from the lower edge of the same. These cutters may preferably consist each of a steel ring, and they may both be secured to the same roller, the roller being provided with two flanges or collars to fit astride the bloom or tire. The cutter-rings may be secured to the flanges by screw-threads, and one of the rings should be of larger interior diameter than the other, so as to fit loosely over the flange to which the smaller ring is secured. When the tire is rolled with its thick edge or flange down, the pressure of the rolls, when the rolling begins, upon the wedge-shaped bloom (wedged shape in cross-section) causes the bloom to rise or tip up from its bed or supports, thus giving the bloom or tire a kind of wabbling or gyratory motion—that is to say, it does not revolve steadily in the same plane or lie flat upon its supporting-rollers. This tendency of the bloom or tire to rise or tip from its bed would tend to cause more or less of a side strain upon the rotary cutters and to cause the tire or bloom to bind therein. To obviate any danger of the tire binding in the rotary cutters from this cause, I prefer to employ, in connection with the rotary cutters, a pair of stationary cutters—one above and one below the tire or bloom—which will serve to cut away the fins that may form on the edges of the bloom when the rolling commences, and until this wabbling motion or tipping tendency of the bloom ceases. These stationary cutters may preferably consist of square or rectangular bars of steel, and they should be set with their faces at a slight angle to the plane of the tire, so as to present a cutting-edge thereto. To prevent this cutting-edge digging into the tire when the rolling begins and when the bloom rises or tips up with great force, the upper knife or bar should be placed to the left of the rolls, or in the direction that the tire is running, so that when the bloom tips it will tend to bring the same parallel to the face of the bar, instead of tending to increase the inclination of the bar to the tire, as it would do if it were placed on the opposite side of the rolls; and the same relative arrangement is adopted in regard to the lower cutter-bar for the same reason. By inclining the face of the cutter-bars slightly and arranging them in this way the tendency of the knives to dig or cut into the bloom when the latter tips or rises up from its bed is prevented, so that the bloom may be readily rolled with its thick edge or flange down and the fin severed by the knives. The rotary knives or cutters are mounted in a movable block or frame, which may be adjusted in or out by a screw or other suitable means, so that the operator may apply the rotary cutter at any time desired and to tires of different diameters. The cutter-rings are also adjustable on their flanges, so as to adapt them for use upon tires of different widths.

Figure 2:
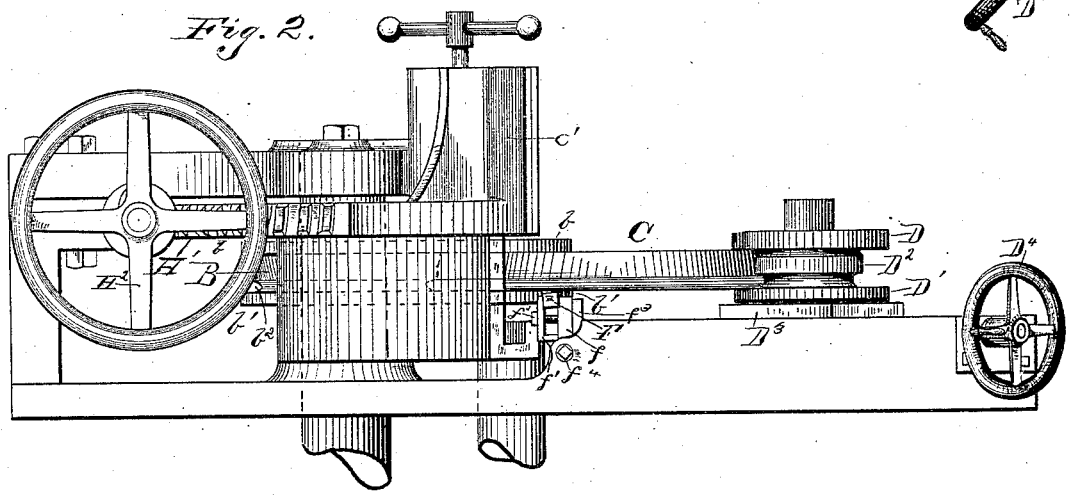
Figure 3:
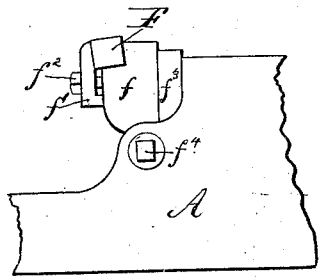
Figure 4:
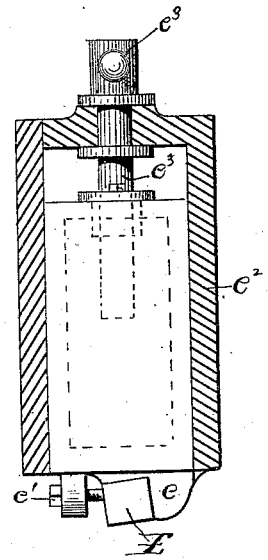
Figure 5:
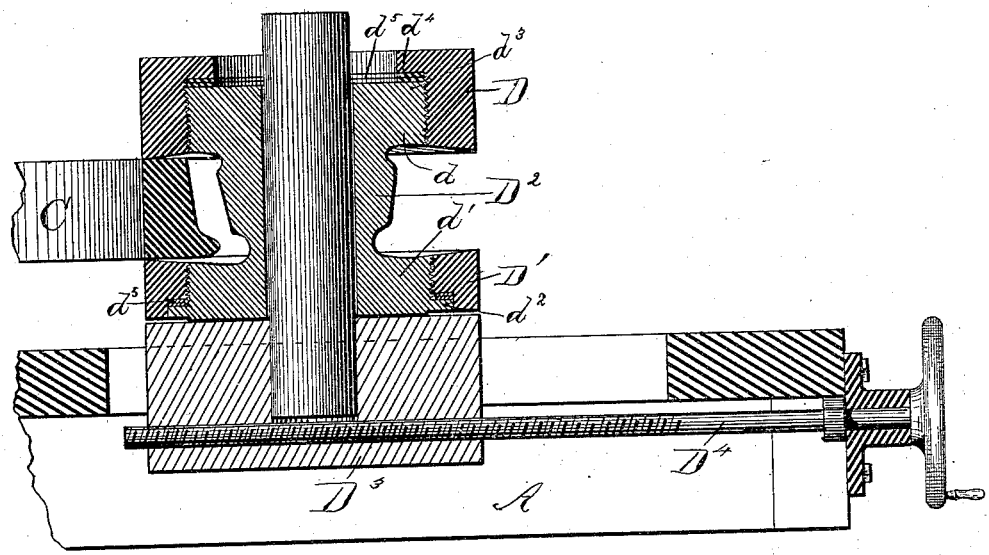

In the accompanying drawings, which form a part of this specification, and in which similar letters of reference indicate like parts, Figure 1 is a plan view of a device embodying my invention. Fig. 2 is a side elevation of the same. Fig. 3 is an end view of the lower stationary cutter. Fig. 4 is an end view of the upper stationary cutter, and Fig. 5 is a section of Fig. 1 centrally through the rotary cutter.

In said drawings, A represents the frame or bed of the machine, B the movable or pressure roll, and B' the outer or main roll. The rolls B and B' are each provided with similar flanges or collars, $b$ $b'$, between which flanges or collars the bloom or tire is confined while being rolled. The depth of the two flanges or collars $b$ $b'$ should be about equal to the thickness of the tire to be rolled. One of the rolls B' is provided with a groove, $b^2$, at its lower edge or corner, to form the flange of the tire.

The mechanism for setting the pressure-roll up against the fixed roll as the rolling proceeds is or may be of any ordinary well-known construction, and need not therefore be further described.

C represents the bloom or tire, and C' the supporting-rollers, journaled on the bed of the machine, upon which the tire rests and revolves around as it is being rolled.

D and D' are the upper and lower rotary cutters, secured by screw-threads to the flanges $d$ $d'$ of the roller $D^2$. The cutter-ring D' is of larger diameter than the cutter-ring D, so that it will drop over the flange $d$. The roller $D^2$ is journaled upon a sliding block or carriage, $D^3$, mounted in a suitable recess or guideway in the frame or bed of the machine, and this block is provided with a hand-screw, $D^4$, by means of which the rotary cutters may be moved to and from the tire. The flanges $d$ $d'$ project from the roller $D^2$, so as to fit over the edges of the tire. The flange $d$ is provided with a shoulder or flange, $d^2$, at its lower edge, against which the cutter-ring D may be set or screwed firmly, and the flange $d'$ is provided with a shoulder, $d^3$, at its upper edge, against which the flange $d^4$ of the cutter-ring D' may be secured home. The cutter-rings D D' may be adjusted to or from each other, so as to operate upon tires of different widths, by placing collars or washers $d^5$ upon the shoulders $d^2$ $d^3$, one or both.

E and F are the upper and lower stationary cutters, consisting, preferably, of square or rectangular bars of steel. The lower cutter-bar, F, is firmly supported and clamped between two horizontal clamp-bars, $f$ and $f'$, by suitable bolts, $f^2$, and the clamp-bar $f$ is dovetailed with a vertical plate, $f^3$, secured to the frame of the machine, so as to slide vertically thereon, and thus effect the vertical adjustment of the cutter-bar D. The vertical movement or adjustment is imparted to the clamp-bar $f$ by means of an adjusting-screw, $f^4$, and wedges attached to said screw, which operate on the under side of said inclined clamp-bar $f$. The cutter-bar F is arranged on a level with the supporting-rollers C', and it is set with its face at a slight inclination or angle to the plane of the tire, as shown in Figs. 2 and 3, so as to present a cutting-edge to the tire when the same is running or resting upon its horizontal bed, and it is arranged on the right-hand side of the rolls, so that when the tire or bloom tips or rises from its bed it will diminish, instead of increase, the inclination of the cutter-bar face to the tire, and thus prevent the bar cutting or digging deeply into the bloom; and the upper cutter-bar, E, is arranged on the opposite or left-hand side, and its face inclined at a similar angle for the same purpose. The cutter E is secured to a movable slide, $e$, by means of a set-screw, $e'$, which slide $e$ is adjustable up and down in the case or frame $e^2$ by means of the adjusting-screw $e^3$. The cutter-bar E also serves to press the tire down flat upon the supporting-rollers C' and cutter-bar F. On a similar adjustable slide mounted in the case or frame E', on the opposite side of the rolls B B', a roller is journaled, which also serves to keep the tire flat upon its supports.

G and G' are the two vertical rollers, which, together with the rolls B B', constitute the three points of the circle, and serve to give the tire its circular form. These rollers G G' are mounted on the pivoted segments H and H', and are swung in or out, according to the increased or diminished diameters of the tire, by means of the right and left hand worm-wheel $H^2$, which engages with the teeth of the segments H H'.

In practicing my invention the rotary cutter-rings D and D' may, if preferred, be secured to separate rollers, instead of to a single roller, as shown; and, if desired, the rotary cutter-rings may be mounted on the vertical guide-rollers G or G' by providing said rollers with suitable flanges; but the method herein shown is what I deem to be the best way known to me of practicing my invention. The rotary cutters preferably consist of the roller $D^2$, having flanges $d$ and $d'$, provided with the cutter-rings D and D', made of steel, as shown, so that the cutter-rings may be removed and replaced by others when worn, and so that the cutters may be adjusted to or from each other to accommodate tires of different widths; but the cutter-rings may of course be made integral with the roller $D^2$ or its flanges.

In a previous application for Letters Patent filed on or about October 18, 1883, I have shown and described a tire-rolling machine having cutters for removing fins from the edges of the tire, the particular form of said cutters being stationary bars. I do not therefore herein claim, broadly, a tire-rolling-machine having cutters, nor a tire-rolling machine having stationary cutter-bars, as the same is the subject of said previous application. The present improvement consists in the use of rotary cutters, and in the combination of the same with stationary cutters.

I claim—

1. In a tire-rolling machine, the combination, with the rolls B and B', provided with flanges $b$ $b'$, to embrace the tire or bloom, of a supplemental roller, $D^2$, provided with flanges $d$ $d'$, furnished with cutting rings or edges D D' for severing the fins from the edges of the tire or bloom as it is rolled, substantially as specified.

2. The combination, with the rolls, of upper and lower rotary cutters and the upper and lower stationary cutters, substantially as specified.

3. The combination of the roller $D^2$, provided with flanges $d$ $d'$, and cutting-rings D D', secured to said flanges, substantially as specified.

4. The combination of the roller $D^2$, having flanges $d$ $d'$, provided with shoulders $d^2$ $d^3$, and cutter-rings D D', secured to said flanges by screw-threads, so that said cutter-rings may be adjusted to or from each other, substantially as specified.

JAMES MUNTON.

Witnesses:
H. M. MUNDAY,
TAYLOR E. BROWN.